US 008822584B2

(12) United States Patent
Whitehouse

(10) Patent No.: US 8,822,584 B2
(45) Date of Patent: Sep. 2, 2014

(54) BIODEGRADABLE POLYESTER BLENDS

(75) Inventor: Robert S. Whitehouse, Lexington, MA (US)

(73) Assignee: Metabolix, Inc., Cambridge, MA (US)

( * ) Notice: Subject to any disclaimer, the term of this patent is extended or adjusted under 35 U.S.C. 154(b) by 278 days.

(21) Appl. No.: 12/991,404

(22) PCT Filed: May 6, 2009

(86) PCT No.: PCT/US2009/002808
§ 371 (c)(1),
(2), (4) Date: Dec. 14, 2010

(87) PCT Pub. No.: WO2009/137058
PCT Pub. Date: Nov. 12, 2009

(65) Prior Publication Data
US 2011/0189414 A1    Aug. 4, 2011

Related U.S. Application Data

(60) Provisional application No. 61/050,896, filed on May 6, 2008, provisional application No. 61/133,023, filed on Jun. 25, 2008, provisional application No. 61/199,817, filed on Nov. 20, 2008, provisional application No. 61/200,619, filed on Dec. 2, 2008, provisional application No. 61/203,542, filed on Dec. 23, 2008, provisional application No. 61/166,950, filed on Apr. 6, 2009.

(51) Int. Cl.
*C08L 67/04* (2006.01)
*C08L 67/02* (2006.01)
*C08K 5/00* (2006.01)

(52) U.S. Cl.
CPC ............... *C08L 67/02* (2013.01); *C08K 5/0083* (2013.01); *C08L 2666/18* (2013.01)
USPC .......... 524/425; 428/35.7; 524/539; 524/101; 521/138

(58) Field of Classification Search
CPC .... C08L 67/02; C08L 2666/18; C08K 5/0083
USPC ....................................... 524/425
See application file for complete search history.

(56) References Cited

U.S. PATENT DOCUMENTS

| | | | |
|---|---|---|---|
| 2,744,095 A | 5/1956 | Caldwell | |
| 3,954,839 A | 5/1976 | Dexter et al. | |
| 3,962,377 A | 6/1976 | Spivack | |
| 4,096,122 A | 6/1978 | Schade et al. | |
| 4,596,886 A | 6/1986 | Hasegawa et al. | |
| 4,617,373 A | 10/1986 | Pruett et al. | |
| 4,859,365 A | 8/1989 | Peninger | |
| 5,043,192 A | 8/1991 | Jones et al. | |
| 5,068,140 A | 11/1991 | Malhotra et al. | |
| 5,112,890 A | 5/1992 | Behrens et al. | |
| 5,202,205 A | 4/1993 | Malhota | |
| 5,446,079 A | 8/1995 | Buchanan et al. | |
| 5,480,394 A | 1/1996 | Ishikawa | |
| 5,580,911 A | 12/1996 | Buchanan et al. | |
| 5,599,858 A | 2/1997 | Buchanan et al. | |
| 5,608,031 A | 3/1997 | Yau et al. | |
| 5,645,752 A | 7/1997 | Weiss et al. | |
| 5,693,389 A | 12/1997 | Liggat | |
| 5,750,605 A | 5/1998 | Blumenthal et al. | |
| 5,800,897 A | 9/1998 | Sharma et al. | |
| 5,922,357 A | 7/1999 | Coombes et al. | |
| 5,952,088 A | 9/1999 | Tsai et al. | |
| 5,973,038 A | 10/1999 | Weaver et al. | |
| 5,985,952 A | 11/1999 | Levy | |
| 5,994,478 A | 11/1999 | Asrar et al. | |
| 6,018,004 A | 1/2000 | Warzelhan et al. | |
| 6,071,450 A | 6/2000 | Topolkaraev et al. | |
| 6,096,809 A | 8/2000 | Lorcks et al. | |
| 6,110,849 A | 8/2000 | Tsai et al. | |
| 6,114,042 A * | 9/2000 | Warzelhan et al. | ........ 428/422.8 |
| 6,135,987 A | 10/2000 | Tsai et al. | |
| 6,177,062 B1 | 1/2001 | Stein et al. | |
| 6,192,892 B1 | 2/2001 | Resler et al. | |
| 6,201,034 B1 | 3/2001 | Warzelhan et al. | |
| 6,235,815 B1 | 5/2001 | Loercks et al. | |
| 6,235,816 B1 | 5/2001 | Lorcks et al. | |
| 6,303,677 B1 | 10/2001 | Warzelhan et al. | |
| 6,342,304 B1 | 1/2002 | Buchanan et al. | |
| 6,388,025 B1 | 5/2002 | Perego et al. | |
| 6,472,497 B2 | 10/2002 | Loercks et al. | |
| 6,479,467 B1 | 11/2002 | Buchanan et al. | |
| 6,538,059 B1 | 3/2003 | Muller et al. | |

(Continued)

FOREIGN PATENT DOCUMENTS

| | | | |
|---|---|---|---|
| EP | 1704180 B1 | | 9/2008 |
| WO | WO 99/23161 | | 5/1999 |
| WO | WO 2004/076582 | * | 9/2004 |
| WO | WO 2005/066256 | | 7/2005 |

OTHER PUBLICATIONS

International Search report for PCT/US2009/002808 dated Jul. 20, 2009.

(Continued)

*Primary Examiner* — Doris Lee
(74) *Attorney, Agent, or Firm* — Hamilton, Brook, Smith & Reynolds, P.C.

(57) ABSTRACT

Compositions comprising linear polyhydroxyalkanoates and biodegradable aromatic/aliphatic polyesters are disclosed, as well as methods for using same, and articles made therefrom.

16 Claims, No Drawings

(56) References Cited

U.S. PATENT DOCUMENTS

| | | | |
|---|---|---|---|
| 6,562,938 B2 | 5/2003 | Haile et al. |
| 6,623,854 B2 | 9/2003 | Bond et al. |
| 6,699,931 B2 | 3/2004 | Kuo et al. |
| 6,703,115 B2 | 3/2004 | Hale et al. |
| 6,706,674 B2 | 3/2004 | Cincotta et al. |
| 6,727,314 B2 | 4/2004 | Burghart et al. |
| 6,743,506 B2 | 6/2004 | Bond et al. |
| 6,746,766 B2 | 6/2004 | Bond et al. |
| 6,767,972 B1 | 7/2004 | Irick, Jr. et al. |
| 6,770,702 B1 | 8/2004 | Muller et al. |
| 6,783,854 B2 | 8/2004 | Bond |
| 6,818,295 B2 | 11/2004 | Bond et al. |
| 6,818,723 B2 | 11/2004 | Sacripante |
| 6,830,810 B2 | 12/2004 | Bond |
| 6,841,597 B2 | 1/2005 | Bastioli et al. |
| 6,844,390 B2 | 1/2005 | Kuo et al. |
| 6,880,320 B2 | 4/2005 | Olinger et al. |
| 6,906,164 B2 | 6/2005 | DeBruin |
| 6,918,927 B2 | 7/2005 | Bates et al. |
| 6,984,426 B2 | 1/2006 | Miksic et al. |
| 7,052,580 B2 | 5/2006 | Trokhan et al. |
| 7,083,697 B2 | 8/2006 | Dao et al. |
| 7,144,632 B2 | 12/2006 | Hayes |
| 7,160,977 B2 | 1/2007 | Hale et al. |
| 7,160,997 B2 | 1/2007 | Chou et al. |
| 7,166,654 B2 | 1/2007 | Fujita et al. |
| 7,172,814 B2 | 2/2007 | Hodson |
| 7,186,789 B2 | 3/2007 | Hossainy et al. |
| 7,196,157 B2 | 3/2007 | Bastioli et al. |
| 7,214,414 B2 | 5/2007 | Khemani et al. |
| 7,220,815 B2 | 5/2007 | Hayes |
| 7,225,518 B2 | 6/2007 | Eidenschink et al. |
| 7,241,832 B2 | 7/2007 | Khemani et al. |
| 7,241,838 B2 | 7/2007 | Shelby et al. |
| 7,284,401 B2 | 10/2007 | Larson et al. |
| 7,297,394 B2 | 11/2007 | Khemani et al. |
| 7,314,480 B2 | 1/2008 | Eidenschink et al. |
| 7,344,034 B2 | 3/2008 | Heinrich et al. |
| 7,354,653 B2 | 4/2008 | Germroth et al. |
| 7,368,503 B2 | 5/2008 | Hale |
| 7,368,511 B2 | 5/2008 | Hale et al. |
| 7,402,170 B2 | 7/2008 | McCullagh et al. |
| 7,459,517 B2 | 12/2008 | Fukui et al. |
| 7,470,290 B2 | 12/2008 | Rodrigues et al. |
| 7,569,273 B2 | 8/2009 | Bredt et al. |
| 7,592,019 B2 | 9/2009 | Drucks et al. |
| 7,597,804 B2 | 10/2009 | Duval et al. |
| 7,619,025 B2 | 11/2009 | Mohanty et al. |
| 7,683,117 B2 | 3/2010 | Moriyama et al. |
| 7,731,685 B2 | 6/2010 | Ragheb et al. |
| 7,744,619 B2 | 6/2010 | Eidenschink |
| 7,766,956 B2 | 8/2010 | Jang |
| 7,803,149 B2 | 9/2010 | Bates et al. |
| 2002/0004578 A1 | 1/2002 | Shelby et al. |
| 2003/0082148 A1 | 5/2003 | Ludwig et al. |
| 2003/0187149 A1 | 10/2003 | Schmidt et al. |
| 2004/0092672 A1 | 5/2004 | Bastioli et al. |
| 2004/0094474 A1 | 5/2004 | Heinrich et al. |
| 2004/0103705 A1 | 6/2004 | Langezaal et al. |
| 2004/0106985 A1 | 6/2004 | Jang |
| 2004/0171757 A1 | 9/2004 | Moens |
| 2004/0213941 A1 | 10/2004 | Whitehouse |
| 2005/0043680 A1 | 2/2005 | Segal et al. |
| 2005/0043786 A1 | 2/2005 | Chu et al. |
| 2005/0060028 A1 | 3/2005 | Horres et al. |
| 2005/0069571 A1 | 3/2005 | Slivka et al. |
| 2005/0079200 A1 | 4/2005 | Rathenow et al. |
| 2005/0107505 A1 | 5/2005 | Shinoda et al. |
| 2005/0137304 A1 | 6/2005 | Strand et al. |
| 2005/0154442 A1 | 7/2005 | Eidenschink et al. |
| 2005/0182473 A1 | 8/2005 | Eidenschink et al. |
| 2005/0209374 A1 | 9/2005 | Matosky et al. |
| 2005/0209377 A1* | 9/2005 | Padwa ................ 524/99 |
| 2005/0278021 A1 | 12/2005 | Bates et al. |
| 2006/0032633 A1 | 2/2006 | Nguyen |
| 2006/0036012 A1 | 2/2006 | Hayes et al. |
| 2006/0036281 A1 | 2/2006 | Patterson et al. |
| 2006/0073346 A1 | 4/2006 | Super et al. |
| 2006/0110464 A1 | 5/2006 | Walls et al. |
| 2006/0115515 A1 | 6/2006 | Pirhonen et al. |
| 2006/0159918 A1 | 7/2006 | Dugan et al. |
| 2007/0021515 A1 | 1/2007 | Glenn et al. |
| 2007/0021534 A1 | 1/2007 | Glenn et al. |
| 2007/0042207 A1 | 2/2007 | Berger et al. |
| 2007/0079945 A1 | 4/2007 | Noda et al. |
| 2007/0088099 A1 | 4/2007 | Mentink et al. |
| 2007/0166317 A1 | 7/2007 | Halbert |
| 2007/0228046 A1 | 10/2007 | Bastioli et al. |
| 2008/0146686 A1 | 6/2008 | Handa |
| 2008/0281018 A1 | 11/2008 | Seeliger et al. |
| 2008/0311813 A1 | 12/2008 | Ting et al. |
| 2008/0315453 A1 | 12/2008 | Molitor et al. |
| 2009/0018235 A1 | 1/2009 | Nascimento et al. |
| 2009/0137057 A1 | 5/2009 | Fraser et al. |
| 2009/0215914 A1 | 8/2009 | Hirose et al. |
| 2009/0270280 A1 | 10/2009 | Zhang et al. |
| 2009/0274885 A1 | 11/2009 | Egawa |
| 2009/0312480 A1 | 12/2009 | Kohama |
| 2010/0015544 A1 | 1/2010 | Agur et al. |
| 2010/0041835 A1 | 2/2010 | Scherzer et al. |
| 2010/0048767 A1 | 2/2010 | Nascimento et al. |
| 2010/0089289 A1 | 4/2010 | Mahiat et al. |

OTHER PUBLICATIONS

Communication pursuant to Rules 161 (1) and 162 for European Application No. 09743045.8. Date Mailed: Dec. 16, 2010.

Notification Concerning Transmittal of International Preliminary Report on Patentability for PCT/US2009/002808. Date Mailed: Nov. 18, 2010.

Written Opinion of the International Searching Authority for PCT/US2009/002808. Date Mailed: Jul. 20, 2009.

Communication pursuant to Article 94(3) EPC for European Application No. 09743045.8. Dated Mailed: Nov. 10, 2011.

* cited by examiner

US 8,822,584 B2

BIODEGRADABLE POLYESTER BLENDS

RELATED APPLICATION

This application is the U.S. National Stage of International Application No. PCT/US2009/002808, filed May 6, 2009, which designates the U.S., published in English, and claims the benefit of U.S. Provisional Application No. 61/050,896, filed on May 6, 2008, U.S. Provisional Application No. 61/133,023, filed on Jun. 25, 2008, U.S. Provisional Application No. 61/199,817, filed on Nov. 20, 2008, U.S. Provisional Application No. 61/200,619, filed on Dec. 2, 2008, U.S. Provisional Application No. 61/203,542, filed on Dec. 23, 2008, and U.S. Provisional Application No. 61/166,950, filed on Apr. 6, 2009. The entire teachings of the above applications are incorporated herein by reference.

The invention relates to blends of biodegradable polyesters with improved properties and processing characteristics, thermoplastics compositions that include such blends, articles produced using such blends (including films, fibers, molded goods such as containers, bottles and the like), and methods of making such blends, compositions, and articles. Such compositions are particularly suitable for injection molding, blow molding, compression molding cast film, blown film, thermoforming, foaming, fiber extrusion and coating applications.

BACKGROUND OF THE INVENTION

Biodegradable plastics are of increasing industrial interest as replacements for non-biodegradable plastics in a wide range of applications and in particular for packaging applications. By blending synthetic degradable polyesters with biologically produced polyesters, materials with improved properties and processing are obtained. Of particular interest are blends with faster crystallization rates, increased rates at which the thermoplastic loses tackiness, as well as the increased mechanical strength of the resin during processing and increased strength of the finished thermoplastic product.

SUMMARY OF THE INVENTION

Disclosed herein are blends of linear biologically-produced polyhydroxyalkanoates (PHAs) and biodegradable aromatic/aliphatic polyesters, methods of making such compositions, and articles and pellets formed from such blends. The biodegradable aromatic/aliphatic polyester is a co polymer of: i) at least one aliphatic dicarboxylic acid; and/or ii) at least one aromatic dicarboxylic acid; and iii) a dihydroxy compound. In certain embodiments, the aliphatic dicarboxylic acid is a $C_2$ to $C_{12}$ aliphatic dicarboxylic acid such as, succinic acid, glutaric acid, dimethyl glutaric acid, adipic acid, sebacic acid or azelaic acid. In certain embodiments, the aromatic dicarboxylic acid is terephthalic acid or naphthalene dicarboxylic acid.

Embodiments may have one or more of the following advantages.

In some embodiments, biodegradable aromatic/aliphatic polyesters and PHAs compositions are provided, which can modify the physical properties of both the biodegradable aromatic/aliphatic polyesters and the PHAs.

In other embodiments, a composition of PHAs and biodegradable aromatic/aliphatic polyesters is provided, which has a modified crystallization behavior and/or other improved physical properties, e.g., increased mechanical strength.

In still other embodiments, an improved method of fabricating a composition, e.g., a composition comprising a PHA and at least one biodegradable aromatic/aliphatic polyester is provided.

In yet other embodiments, articles that include a composition of PHAs and biodegradable aromatic/aliphatic polyesters are provided, which have improved physical and/or economic characteristics.

Disclosed herein is a composition that includes a linear biologically-produced PHA, a biodegradable aromatic/aliphatic polyester, and a nucleating agent.

Also disclosed herein are methods of forming biodegradable polymeric compositions, where the method includes combining a linear biologically-produced PHA, a biodegradable aromatic/aliphatic polyester, and a nucleating agent, under conditions sufficient to form a largely homogeneous composition forming a biodegradable polymeric composition.

Additionally, disclosed herein is composition of a polymer resin pellet that includes a linear biologically-produced PHA, a biodegradable aromatic/aliphatic polyester, and a nucleating agent.

In any of the compositions or methods disclosed herein, the biodegradable aromatic/aliphatic polyester can have a glass transition temperature ($T_g$) of about 0° C. or less, of about −10° C. or less, or of about −20° C. or less. The glass transition temperature is the temperature at which an amorphous solid, such as glass or a polymer, becomes brittle on cooling, or soft on heating. As the temperature of a polymer drops below its $T_g$, it behaves in an increasingly brittle manner. As the temperature rises above the $T_g$, the polymer becomes more rubber-like. In particular embodiments, the biodegradable aromatic/aliphatic polyester is a polybutylene adipate-terephthalate. Alternatively, the biodegradable aromatic/aliphatic polyester is polybutylene succinate. Alternatively, the biodegradable aromatic/aliphatic polyester is a polybutylene succinate adipate. Alternatively, the biodegradable aromatic/aliphatic polyester is a polyethylene terephthalate. In other embodiments, the polyethylene terephthalate is a co-monomer. The co-monomer is an ether or amide or aliphatic monomer. In particular embodiments, the biodegradable aromatic/aliphatic polyester is a polybutylene adipate/terephthalate or a polymethylene adipate/terephthalate.

In any of the compositions, pellets or methods disclosed herein, the PHA can include one or more of the following: poly-3-hydroxybutyrate (PHB), poly-3-hydroxyvalerate (PHV), poly-3-hydroxybutyrate-co-4-hydroxybutyrate (PHB4HB) having from about 2% to about 40% 4HB content, a mixture of PHB and PHB4HB, a mixture of poly-3-hydroxybutyrate and (poly(3-hydroxybutyrate-co-10-13%-poly(4-hydroxybutyrate) and (poly(3-hydroxybutyrate-co-26-35%-poly(4-hydroxybutyrate), poly-3-hydroxybutyrate-co-3-hydroxyvalerate (PHBV), a mixture of PHB and PHBV, poly-3-hydroxybutyrate-co-3-hydroxyhexanoate (PHBH) having from about 3% to 15% H content, a mixture of PHB and PHBH, or a mixture of PHB and poly-3-hydroxybutyrate-co-3-hydroxy-X, where X is C7-C18 alkyl or a mixture thereof. The PHA can also include mixtures of any of these PHAs. The PHA can have a glass transition temperature (Tg) of about 10° C. or less, of about 0° C. or less, or about −10° C. or less. The PHA can include a blend containing a first PHA having a glass transition temperature greater than about 0° C. and a second PHA having a glass transition temperature less than or equal to about −15° C., where the first PHA and the second PHA are not miscible with each other. The PHA can be a polymer comprising at least a first co-monomer and a second co-monomer and optionally a third co-monomer, and where the co-monomers are different from each other. The first co-monomer is 3-hydroxybutyrate. The PHA can include about 70 to about 98 percent by weight of 3-hydroxybutyrate. The second co-monomer can be selected from the group consisting of 3-hydroxyvalerate, and 4-hydroxybutyrate. The PHA can include from about 2 to about 12 percent by weight of 3-hydroxyvalerate or 4-hydroxybutyrate. The PHA can include poly 3-hydroxybutyrate-co-3-hydroxyvalerate or poly 3-hydroxybutyrate-co-4-hydroxybutyrate. The PHA can have a molecular weight ranging from about 200,000 Daltons to about 850,000 Daltons. The polyhydroxyalkanoate can be selected from the group consisting of polyhydroxybutyrate, polyhydroxyvalerate, polyhydroxyhexanoate, polyhydroxybutyrate-co-polyhydroxyvalerate, and polyhydroxybutyrate-co-polyhydroxyhexanoate and combinations thereof. The polyhydroxybutyrate can be poly(3-hydroxybutyrate). The polyhydroxybutyrate can be poly(4-hydroxybutyrate). The polyhydroxyalkanoate can be poly 3-hydroxybutyrate-co-4-hydroxybutyrate. The 4-hydroxybutyrate can be present in the poly 3-hydroxybutyrate-co-4-hydroxybutyrate in a range of about 2% to about 40%. The PHA can have a valerate content sufficient to provide a melting temperature greater than about 100° C. and less than about 175° C., as measured by differential scanning calorimetry. The PHA can be provided in raw form, or as processed resin.

In any of the compositions, pellets or methods disclosed herein, the composition can have a melting temperature of about 175° C. or less, as measured by differential scanning calorimetry. In certain embodiments, from 5 to 95 percent by weight of the composition is biodegradable aromatic/aliphatic polyester. In other embodiments, from 10 to 50 percent by weight of the composition is biodegradable aromatic/aliphatic polyester. In other embodiments, the composition can include from about 10 to about 40 percent by weight of the biodegradable aromatic/aliphatic polyester (e.g., polybutylene adipate/terephthalate). In certain embodiments, from 5 to 95 percent by weight of the composition is linear PHA. In other embodiments, from 50 to 90 percent by weight of the composition is linear PHA.

Also disclosed herein is an article comprising the composition or pellet as disclosed herein, or a composition or pellet made by any of the methods disclosed herein. The article is in the form of a film, sheet, molding, fiber, filament, rod, tube, bottle, or foam.

Also disclosed is a process that includes forming an article from composition or pellet as disclosed herein. Such forming is for example, molding, extruding, or blowing the composition or pellets. Also disclosed are articles made by such processes.

Other features and advantages of the invention will be apparent from the following detailed description, and from the claims.

DETAILED DESCRIPTION OF THE INVENTION

The invention provides blends of linear biologically produced polyhydroxyalkanaoate (PHA) polyesters and biodegradable aromatic/aliphatic polyesters, where the blends have improved properties for thermoplastic processing and applications. The biodegradable aromatic/aliphatic polyesters described herein is any such biodegradable polyester, and is biologically produced, or chemically synthesized. The aromatic/aliphatic polyester is a co polymer of: i) at least one aliphatic dicarboxylic acid; and/or ii) at least one aromatic dicarboxylic acid; and iii) a dihydroxy compound.

The polyesters can be made from fossil carbon (i.e., a petroleum-based polymer, e.g., synthetic polyesters such as, but not limited to, synthetic polyesters, e.g., BIOMAX® (du Pont), ECOFLEX® (BASF), BIONELLE® (Showa Denko), TONE® (Dow Chemicals) CAPA® (Perstorp Ltd) or others), or made from biomass or renewable sources of carbon.

Methods for using the blends of PHA and biodegradable aromatic/aliphatic polyesters are also provided. The invention also includes thermoplastic compositions that include the biodegradable aromatic/aliphatic polyesters, which is used to create a wide array of useful articles.

The compositions and polymer blends described herein are processed for making products using known methods for processing polymer compositions, including injection molding, compression molding, thermoforming, extrusion, casting, blowing, etc. In making useful products from these polymers, typically a three step process is used comprising, melting, shaping and cooling. Variations on these steps are also used for generating desired products. Melting of the polymer or resins occurs at the temperature at which the polymer resin changes from a solid to liquid. For example, a polymer blend can be mixed and melted in an extruder and then molded and cooled to make a desired product.

Polyhydroxyalkanoates (PHAs)

The polyhydroxyalkanoates compositions used in the compositions and methods of the invention are linear polymers. In the compositions and methods of the invention, the PHAs can be a single polymer or a polymer blend. PHAs are biological polyesters synthesized by a broad range of natural and genetically engineered bacteria as well as genetically engineered plant crops (Braunegg et al., (1998), *J. Biotechnology* 65: 127-161; Madison and Huisman, 1999, *Microbiology and Molecular Biology Reviews*, 63: 21-53; Poirier, 2002, Progress in Lipid Research 41: 131-155). These polymers are biodegradable thermoplastic materials, produced from renewable resources, with the potential for use in a broad range of industrial applications (Williams & Peoples, 1996, *CHEMTECH* 26:38-44). Useful microbial strains for producing PHAs, include *Alcaligenes eutrophus* (renamed as *Ralstonia eutropha*), *Alcaligenes latus, Azotobacter, Aeromonas, Comamonas, Pseudomonads*, and genetically engineered organisms including genetically engineered microbes such as *Pseudomonas, Ralstonia* and *Escherichia coli*.

In general, a PHA is formed by enzymatic polymerization of one or more monomer units inside a living cell. Over 100 different types of monomers have been incorporated into the PHA polymers (Steinbüchel and Valentin, 1995, FEMS Microbiol. Lett. 128; 219-228. Examples of monomer units incorporated in PHAs include 2-hydroxybutyrate, lactic acid, glycolic acid, 3-hydroxybutyrate (hereinafter referred to as HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH), 3-hydroxyacid monomers incorporated into PHAs are the (D) or (R) 3-hydroxyacid isomer with the exception of 3HP which does not have a chiral center.

A monomer, comonomer or polymer made by these processes, may contain small amounts of other monomers, comonomers, or polymers, generally less than 1% by weight, due to its being made in a biological system.

In some embodiments of the invention, the PHA can be a homopolymer (all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as PHB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)). In the compositions and methods of the present invention, the PHAs described above can be blended with biodegradable aromatic/aliphatic polyesters described below. In particular embodiments, the PHAs described above are combined with polybutylene adipate terephthalate. Alternatively, the PHAs are combined with polyethylene adipate terephthalate. Alternatively, the PHAs are combined with polybutylene succinate terephthalate. Alternatively, the PHAs are combined with polyethylene succinate terephthalate.

In certain embodiments, the PHA can be a copolymer (contain two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as PHB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV). By selecting the monomer types and controlling the ratios of the monomer units in a given PHA copolymer a wide range of material properties can be achieved. In the compositions and methods of the present invention, the PHAs copolymers described above can be blended with biodegradable aromatic/aliphatic polyesters described below. In particular embodiments, the PHAs copolymers described above are combined with polybutylene adipate terephthalate. In other embodiments, the PHA copolymers are combined with polyethylene adipate terephthalate. Alternatively, the PHA copolymers are polybutylene succinate terephthalate. In particular embodiments, the PHAs copolymers described above are combined with polyethylene succinate terephthalate.

Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers For example, 92%, 93%, 94%, 95%, 96% by weight of the copolymer and the HX comprises one or more monomers selected from 3HH, 3HO, 3HD, 3HDd. In the compositions and methods of the present invention, the PHAs copolymers described above can be blended with biodegradable aromatic/aliphatic polyesters described below. In particular embodiments, the PHAs copolymers described above are combined with polybutylene adipate terephthalate. In other embodiments, the PHA copolymers are combined with polyethylene adipate terephthalate. Alternatively, the PHA copolymers are polybutylene succinate terephthalate. In particular embodiments, the PHAs copolymers described above are combined with polyethylene succinate terephthalate.

The homopolymer (all monomer units are identical) PHB and 3-hydroxybutyrate copolymers (PHB3HP, PHB4HB, PHB3HV, PHB4HV, PHB5HV, PHB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to −10° C., and a melting temperature $T_M$ of between 80° C. to 180° C. Type 2 PHB copolymers typically have a Tg of −20° C. to −50° C. and Tm of 55° C. to 90° C. In the compositions and methods of the present invention, the PHAs copolymers described above in this paragraph can be blended with biodegradable aromatic/aliphatic polyesters described below. In particular embodiments, the PHAs copolymers described above are combined with polybutylene adipate terephthalate. Alternatively, the PHA copolymers are combined with polyethylene adipate terephthalate. Alternatively, the PHA copolymers are polybutylene succinate terephthalate. In particular embodiments, the PHAs copolymers described above are combined with polyethylene succinate terephthalate.

Preferred Type 1 PHB copolymers have two monomer units with have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV;

PHB3HP is a Type 1 PHB copolymer where the 3-HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP;

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB;

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4HV;

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV;

PHB3HH is a Type 1 PHB copolymer where the 3HH content is in the range of 3% to 15% by weight of the copolymer and preferably in the range of 4% to 15% by weight of the copolymer for example: 4% 3HH; 5%

3HH; 6% 3HH; 7% 3HH; 8% 3HH; 9% 3HH; 10% 3HH; 11% 3HH; 12% 3HH; 13% 3HH; 14% 3HH; 15% 3HH, PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer;

Type 2 PHB copolymers have a 3HB content of between 80% and 5% by weight of the copolymer, For example, 75%, 70%, 65%, 60%, 55%, 50%, 45%, 40%, 30%, 10% by weight of the copolymer;

PHB4HB is a Type 2 PHB copolymer where the 4HB content is in the range of 20% to 60% by weight of the copolymer and preferably in the range of 25% to 50% by weight of the copolymer for example: 25% 4HB; 30% 4HB; 35% 4HB; 40% 4HB; 45% 4HB; 50% 4HB by weight of the copolymer;

PHB5HV is a Type 2 PHB copolymer where the 5HV content is in the range of 20% to 60% by weight of the copolymer and preferably in the range of 25% to 50% by weight of the copolymer for example: 25% 5HV; 30% 5HV; 35% 5HV; 40% 5HV; 45% 5HV; 50% 5HV by weight of the copolymer;

PHB3HH is a Type 2 PHB copolymer where the 3HH is in the range of 35% to 95% by weight of the copolymer and preferably in the range of 40% to 80% by weight of the copolymer for example: 40% 3HH; 50% 3HH; 60% 3HH; 70% 3HH; 80% 3HH by weight of the copolymer PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 50% 3HX; 60% 3HX; 70% 3HX; 80% 3HX; 90% 3HX by weight of the copolymer.

In the compositions and methods of the present invention, the PHB Type 1 and Type 2 copolymers described above can be blended with biodegradable aromatic/aliphatic polyesters described below. In particular embodiments, the PHA Type 1 and Type 2 copolymers described above are combined with polybutylene adipate terephthalate. Alternatively, the PHB Type 1 and Type 2 copolymers are combined with polyethylene adipate terephthalate. Alternatively, the PHB Type 1 and Type 2 copolymers are polybutylene succinate terephthalate. In particular embodiments, the PHB Type 1 and Type 2 copolymers described above are combined with polyethylene succinate terephthalate.

PHAs for use in the methods, compositions and pellets described in this invention are selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend. In the compositions and methods of the present invention, the PHAs copolymers blends described above can be blended with biodegradable aromatic/aliphatic polyesters described below. In particular embodiments, the PHAs copolymers blends described above are combined with polybutylene adipate terephthalate. Alternatively, the PHAs copolymers blends are combined with polyethylene adipate terephthalate. In particular embodiments, the PHAs copolymers blends described above are combined with polybutylene succinate terephthalate. Alternatively, the PHAs copolymers blends are combined with polyethylene succinate terephthalate in the compositions and methods described herein.

As noted above, the PHA in the compositions and methods of the invention can be a PHA blend. The PHA blend of PHB with a Type 1 PHB copolymer can be a blend of PHB with PHBP where the PHB content in the PHA blend is in the range of 5% to 90% by weight of the PHA in the PHA blend and the 3HP content in the PHBP is in the range of 7% to 15% by weight of the PHBP.

The PHA blend of PHB with a Type 1 PHB copolymer can be a blend of PHB with PHB3HV where the PHB content of the PHA blend is in the range of 5% to 90% by weight of the PHA in the PHA blend and the 3HV content in the PHB3HV is in the range of 4% to 22% by weight of the PHBV.

The PHA blend of PHB with a Type 1 PHB copolymer can be a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer can be a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer can be a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer can be a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer can be a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend can be a blend of a Type 1 PHB copolymer selected from the group PHBP, PHB4HB, PHBV, PHV4HV, PHB5HV, PHB3HH and PHB3HX with a second Type 1 PHB copolymer which is different from the first Type 1 PHB copolymer and is selected from the group PHBP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

In the compositions and methods of the present invention, the PHA blend of PHB with a Type 1 PHB copolymer described in the paragraphs above are blended with biodegradable aromatic/aliphatic polyesters described below. In particular embodiments, these PHAs copolymers blends described above are combined with polybutylene adipate terephthalate. Alternatively, the PHA blend of PHB with a Type 1 PHB copolymer described in the paragraphs above are combined with polyethylene adipate terephthalate. Alternatively, these PHAs copolymers blends described above are combined with polybutylene succinate terephthalate. Alternatively, these PHAs copolymers blends described above are combined with polyethylene succinate terephthalate in the compositions and methods described herein.

The PHA blend of PHB with a Type 2 PHB copolymer can be a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer can be a blend of PHB with PHB5HV where the PHB content in the PHA blend is in the range of 30% to 95% by weight of the PHA in the PHA blend and the 5HV content in the PHB5HV is in the range of 20% to 60% by weight of the PHB5HV.

The PHA blend of PHB with a Type 2 PHB copolymer can be a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer can be a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX. In the compositions and methods of the present invention, the PHA blend of PHB with a Type 2 PHB copolymer described above can be blended with biodegradable aromatic/aliphatic polyesters described below. In other embodiments, the PHA blend of PHB with a Type 2 PHB copolymer described in the paragraphs above are combined with polybutylene adipate terephthalate. Alternatively, the PHA blend of PHB with a Type 1 PHB copolymer described in the paragraphs above are combined with polyethylene adipate terephthalate. Alternatively, these PHAs copolymers blends described above are combined with polybutylene succinate terephthalate. Alternatively, these PHAs copolymers blends described above are combined with polyethylene succinate terephthalate in the compositions and methods described herein.

The PHA blend can be a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend. In the compositions and methods of the present invention, blend of PHB with a Type 1 PHB copolymer and a Type 2 PHB copolymer described are blended with biodegradable aromatic/aliphatic polyesters described below. In particular embodiments, the PHAs copolymers described above are combined with polybutylene adipate terephthalate. Alternatively, the PHA copolymers are combined with polyethylene adipate terephthalate. Alternatively, the PHA copolymers are polybutylene succinate terephthalate. In particular embodiments, the PHAs copolymers described above are combined with polyethylene succinate terephthalate.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX. In the compositions and methods of the invention, the PHA blends described in this paragraph are blended with biodegradable aromatic/aliphatic polyesters described below. In particular embodiments, these PHAs copolymers blends are combined with polybutylene adipate terephthalate. In other embodiments, these PHA copolymer blends are combined with polyethylene adipate terephthalate. In yet other embodiments, these PHA copolymer blends are combined with polybutylene succinate terephthalate. In particular embodiments, these PHAs copolymers blends are combined with polyethylene succinate terephthalate in the compositions and methods described herein.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. In particular embodiments, the PHAs copolymers blends described above are combined with polyethylene adipate terephthalate. In particular embodiments, the PHAs copolymers blends described above are combined with polybutylene succinate terephthalate. Alternatively, the PHAs copolymers blends described above are combined with polyethylene succinate terephthalate in the compositions and methods described herein.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. In particular embodiments, the PHAs copolymers blends described above are combined with polyethylene adipate terephthalate. In other embodiments, the PHAs copolymers blends described above are combined with polybutylene succinate terephthalate. In other embodiments, the PHAs copolymers blends described above are combined with polyethylene succinate terephthalate in the compositions and methods described herein.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. In particular embodiments, the PHAs copolymers blends described above are combined with polyethylene adipate terephthalate. In other embodiments, the PHAs copolymers blends described above are combined with polybutylene succinate terephthalate. In particular embodiments, the PHAs copolymers blends described above are combined with polyethylene succinate terephthalate in the compositions and methods described herein.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For example, a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV. In the compositions and methods of the invention, the PHA blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

The PHA blend can be a blend as disclosed in U.S. Pub. App. No. 2004/0220355, by Whitehouse, published Nov. 4, 2004, which is incorporated herein by reference in its entirety. In the compositions and methods of the invention, this PHA blend is blended with biodegradable aromatic/aliphatic polyesters described below. In particular embodiments, the PHA blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

Microbial systems for producing the PHB copolymer PHBV are disclosed in U.S. Pat. No. 4,477,654 to Holmes. PCT WO 02/08428, by Skraly and Sholl describes useful systems for producing the PHB copolymer PHB4HB. Useful processes for producing the PHB copolymer PHB3HH have been described (Lee et. al., 2000, Biotechnology and Bioengineering, 67: 240-244; Park et al., 2001, Biomacromolecules, 2: 248-254). Processes for producing the PHB copolymers PHB3HX have been described by Matsusaki et. al., (*Biomacromolecules*, 2000, 1: 17-22).

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

In certain embodiments, the PHA is PHB or a Type 1 PHB copolymer such as PHBP, PHB4HB, PHB3HV, PHB4HV, PHB5HV, PHB3HH or PHB3HX and are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In more particular embodiments, the PHA is PHB, PHB3HV where the 3HV content is in the range of 2% to 22% by weight of the polymer, PHB3HP where the 3HP content is in the range of 3% to 15% by weight of the polymer, PHB4HB where the 4HB content is in the range of 3% to 15% by weight of the polymer, PHB4HV where the 4HV content is in the range of 3% to 15% by weight of the polymer, PHB3HH where the 3HH content is in the range of 3% to 15% by weight of the polymer or PHB3HX where the 3HX content is in the range of 3% to 12% by weight of the polymer. The percent range indicated is the percent weight of monomer relative to the total weight of the polymer. For example, in PHB4HB with 3% to 15% 4HB content, 3% to 15% of the total PHB4HB polymer weight is 4-hydroxybutyrate. In the compositions and methods described herein the PHA is blended with biodegradable aromatic/aliphatic polyesters described below. In particular embodiments, the PHAs described above are combined with polybutylene adipate terephthalate. Alternatively, the PHAs are combined with polyethylene adipate terephthalate. Alternatively, the PHAs are combined with polybutylene succinate terephthalate. In particular embodiments, the PHAs described above are combined with polyethylene succinate terephthalate.

In certain embodiments, PHA is PHB blended with a Type 1 PHB copolymer selected from the group: PHB3HV where the 3HV content is in the range of 2% to 22% by weight of the polymer, PHB3HP where the 3HP content is in the range of 3% to 15% by weight of the polymer, PHB4HB where the 4HB content is in the range of 3% to 15% by weight of the polymer, PHB4HV where the 4HV content is in the range of 3% to 15% by weight of the polymer, PHB3HH where the 3HH content is in the range of 3% to 15% by weight of the polymer or PHB3HX where the 3HX content is in the range of 3% to 12% by weight of the polymer. In the compositions and methods described herein these PHAs described in this paragraph are blended with biodegradable aromatic/aliphatic polyesters described below. In particular embodiments, the PHA blends described above are combined with polybutylene adipate terephthalate. Alternatively, the PHAs are combined with polyethylene adipate terephthalate. Alternatively, the PHAs are combined with polybutylene succinate terephthalate. In particular embodiments, the PHAs described above are combined with polyethylene succinate terephthalate.

In certain embodiments, the PHA blend is PHB blended with a Type 2 PHB copolymer selected from the group: PHB4HB where the 4HB content is in the range of 20% to 60% by weight of the polymer, PHB3HH where the 3HH content is in the range of 35% to 90% by weight of the polymer, PHB5HV where the 5HV content is in the range 20% to 60% by weight of the copolymer or PHB3HX where the 3HX content is in the range of 30% to 90% by weight of the copolymer. In the compositions and methods described herein these PHAs described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In more particular embodiments, the PHA blend is: a) PHB blended with b) a PHB4HB with a 5% to 15% 4HB content; a) PHB blended with b) a PHB3HV with a 5% to 22% 3HV content; a) PHB blended with b) a PHB3HH with a 3% to 15% 3HH content; a) PHB blended with b) a PHB3HX with a 3% to 12% 3H content; a) PHB blended with b) a PHB5HV with a 3% to 15% 5HV content; a) a PHB4HB with a 5% to 15% 4HB content blended with b) a PHB3HV) with a 5% to 22% 3HV content; a) a PHB4HB with 5% to 15% 4HB content blended with b) a PHB3HH with a 3% to 15% 3HH content or a) a PHB3HV with a 5% to 22% 3-hydroxyvalerate content blended with b) a polyPHB3HV with a 3% to 15% 3HH content. In the compositions and methods described herein these PHAs described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In other particular embodiments, the PHA blend is: a) PHB blended with b) a PHB4HB and the weight of polymer a) is 5% to 95% of the combined weight of polymer a) and polymer b); a) PHB blended with b) a PHB3HV and the weight of polymer a) is 5% to 95% of the combined weight of polymer a) and polymer b); a) PHB blended to with b) PHB3HH and the weight of polymer a) is 5% to 95% of the combined weight of polymer a) and polymer b); a) PHB4HB blended with b) a PHB3HV and the weight of polymer a) is 5% to 95% of the combined weight of polymer a) and polymer b); a) a PHB4HB blended with b) a PHB3HH and the weight of polymer a) is 5% to 95% of the combined weight of polymer a) and polymer b); or a) a PHB3HV blended with b) a PHB3HH and the weight of polymer a) is 5% to 95% of the combined weight of polymer a) and polymer b). In the compositions and methods described herein these PHAs described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In yet other particular embodiments, the PHA blend is: a) PHB blended with b) a PHB4HB with a 20-60% 4-HB content; a) PHB blended with b) a PHB5HV with a 20% to 60% 5HH content; a) PHB blended with b) a PHB3HH having a 35%-95% 3-HH content; a) PHB4HB with a 3% to 15% 4HB content blended with b) a PHB4HB with a 20-60% 4HB; a) PHB4HB with a 3% to 15% 4-hydroxybutyrate content blended with b) a PHB5HV with a 20% to 60% 5HV content; a) a PHB4HB with 3% to 15% 4HB content blended with b) a PHB3HX having a 30%-90% 3HX content; a) a PHB3HV with a 3% to 22% 3HV content blended with b) PHB4HB with a 20-60% 4HB content; a) a PHB3HV with a 3% to 22% 3HV content blended with b) PHB5HV with a 20% to 60% 5HV content; a) a PHB3HV with a 3% to 22% 3HV content blended with b) a PHB3HH having a 35%-90% 3-HH content; a) a PHB3HH with a 3% to 15% 3HH content blended with b) a PHB4HB with a 20-60% 4HB content; a) a PHB3HX with a 3% to 12% 3HX content blended with b) a PHB4HB with a 20-60% 4HB content; a) a PHB3HX with a 3% to 12% 3H content blended with b) a PHB5HV with a 20-60% 5HV content; a) a PHB3HH with a 3% to 15% 3HH content blended with b) a PHB5HV with a 20% to 60% 5-HV; a) a PHB3HH with a 3% to 15% 3HH content blended with b) a PHB3HX with a 30% to 90% 3HX content or a) a PHB3HH with a 3% to 15% 3HH content blended with b) a PHB3HH having a 3HH content of 35%-90%. In the compositions and methods described herein the PHAs blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In more particular embodiments, the PHA blend is: PHB blended with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend. In the compositions and methods described herein the PHAs blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In the embodiments described in the immediately preceding paragraphs describing PHA blends of polymer a and b) or two polymer components, the copolymer blend comprises polymer a) and polymer b), wherein the weight of polymer a) is 20% to 60% of the combined weight of polymer a) and polymer b) and the weight of polymer b is 40% to 80% of the combined weight of polymer a) and polymer b). In the compositions and methods described herein the PHAs blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In other embodiments, the PHA blends described herein (e.g., blends comprising polymer a) and polymer b) or which otherwise describe two polymer components) comprise a third polymer, polymer c) which is a PHB4HB with a 20% to 60% 4HB content. In the compositions and methods described herein the PHAs blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In other embodiments the PHA blends described herein (e.g., blends comprising polymer a) and polymer b) or which otherwise describe two polymer components) comprise a third polymer, polymer c) which is a PHB5HV with a 20% to 60% 5HV content. In the compositions and methods described herein the PHAs blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In other embodiments, the PHA blends described herein (e.g., blends comprising polymer a) and polymer b) or which otherwise describe two polymer components) comprise a third polymer, polymer c) which is a PHB3HH with a 5% to 50% 3HH content. In the compositions and methods described herein the PHAs blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

In other embodiments, the PHA copolymer blend comprises polymer a), polymer b) and polymer c). In particular embodiments, wherein the weight of polymer c) is 5% to 95% of the combined polymer weight of polymer a), polymer b) and polymer c). In yet other embodiments, the weight of polymer c) is 5% to 40% of the combined polymer weight of polymer a), polymer b) and polymer c). In the compositions and methods described herein the PHAs blends described in this paragraph are blended with biodegradable aromatic/aliphatic polyesters described below. In particular embodiments, the PHAs copolymers blends described above are combined with polybutylene adipate terephthalate. Alternatively, the PHA copolymers blends are combined with polyethylene adipate terephthalate. Alternatively, the PHA copolymers blends are combined with polybutylene succinate terephthalate. In particular embodiments, the PHAs copolymers blends described above are combined with polyethylene succinate terephthalate.

For instance, the PHA can be poly(3-hydroxybutyrate), or poly(4-hydroxybutyrate). The PHA can be poly(3-hydroxybutyrate), mixed with poly(4-hydroxybutyrate), or poly(3-hydroxybutyrate), mixed with poly(3-hydroxybutyrate-co-poly(4-hydroxybutyrate), for instance about 10% to about 80% poly(3-hydroxybutyrate), mixed with about 10% to about 90% poly(3-hydroxybutyrate-co-poly(4-hydroxybutyrate). The poly(4-hydroxybutyrate) component in the poly (3-hydroxybutyrate-co-poly(4-hydroxybutyrate) copolymer can be about 5% to about 50%. For instance, it can be about 10% to about 15%, or it can be about 25% to about 35%.

For instance, the PHA can be about 20% poly(3-hydroxybutyrate), mixed with about 80% (poly(3-hydroxybutyrate-co-11%-poly(4-hydroxybutyrate). The PHA can also be about 60% poly(3-hydroxybutyrate), mixed with about 40% (poly(3-hydroxybutyrate-co-11%-poly(4-hydroxybutyrate). The PHA can also be about 12% poly(3-hydroxybutyrate), mixed with about 48% (poly(3-hydroxybutyrate-co-11%-poly(4-hydroxybutyrate), and about 40% (poly(3-hydroxybutyrate-co-28%-poly(4-hydroxybutyrate). The PHA can also be about 36% poly(3-hydroxybutyrate), mixed with about 24% (poly(3-hydroxybutyrate-co-11%-poly(4-hydroxybutyrate), and about 40% (poly(3-hydroxybutyrate-co-28%-poly(4-hydroxybutyrate).

The PHA can also be a poly(3-hydroxybutyrate), mixed with about 3% to about 22% poly(3-hydroxyvalerate).

Biodegradable Aromatic/Aliphatic Polyesters

Aromatic polyesters, which are not biodegradable, are synthesized by the polycondensation of aliphatic diols and aromatic dicarboxylic acids. The aromatic ring is resistant to hydrolysis, preventing biodegradability. Polyethylene terephthalate (PET) and polybutylene terephthalate (PBT) are formed by the polycondensation of aliphatic glycols and terephthalic acid. The biodegradability of aromatic polyesters can be modified by the addition of monomers that are not resistant to hydrolysis, aliphatic diol or diacid groups. The addition of such hydrolysis-sensitive monomers creates weak spots for hydrolysis to occur.

Aromatic/aliphatic polyesters are also made by polycondensation of aliphatic diols, but with a mixture of aromatic and aliphatic dicarboxylic acids. For instance, modification of PBT by addition of aliphatic dicarboxylic acids can produce polybutylene succinate terephthalate (PBST) (butane diol as the aliphatic diol and succinic and terephthalic acid). Another example is the family of polyesters sold under the trade name Biomax™ (du Pont), the members of which are polymerized from PET and a variety of aliphatic acid monomers such as dimethylglutarate and diethylene glycol. In the synthesis of polybutylene adipate terephthalate (PBAT), butanediol is the diol, and the acids are adipic and terephthalic acids. Commercial examples include Ecoflex (BASF) and Eastar Bio (Novamont). Ecoflex has a melt temperature (Tm) of about 110° C. to about 120° C., as measured by differential scanning calorimetry (DSC). In preferred embodiments, the biodegradable polymers described in U.S. Pat. Nos. 6,018,004; 6,114,042; 6,201,034; and 6,303,677, incorporated by reference, are used in the compositions and methods described herein.

Biodegradable polymers therefore include polyesters containing aliphatic components. Among the polyesters are ester polycondensates containing aliphatic constituents or poly (hydroxycarboxylic) acids. In certain embodiments, the ester polycondensates include diacids/diol aliphatic polyesters such as polybutylene succinate, polybutylene succinate co-adipate, aliphatic/aromatic polyesters such as terpolymers made of butylenes diol, adipic acid and terephtalic acid.

Examples of biodegradable aromatic/aliphatic polyesters therefore include, but are not limited to, various copolyesters of PET and PBT with aliphatic diacids or diols incorporated into the polymer backbone to render the copolyesters biodegradable or compostable; and various aliphatic polyesters and copolyesters derived from dibasic acids, e.g., succinic acid, glutaric acid, adipic acid, sebacic acid, azealic acid, or their derivatives (e.g., alkyl esters, acid chlorides, or their anhydrides) and dihydroxy compounds (diols) such as $C_2$-$C_6$ alkanediols and $C_5$-$C_{10}$ cycloalkanediols, such as ethylene glycol, propylene glycol, 1,4-butanediol, 1,6 hexanediol. In other embodiments, the diol is 1,4 cyclohexanedimethanol. In preferred embodiments, the dihydroxy compound is ethylene glycol, or 1,4-butanediol. Biodegradable diols are preferred in certain embodiments.

Examples of a suitable commercially available diacid/diol aliphatic polyesters are-the polybutylene succinate (PBS) and polybutylene succinate/adipate (PBSA) copolymers BIONOLLE 1000 and BIONOLLE 3000 from the Showa High Polymer Company, Ltd. (Tokyo, Japan). An example of a suitable commercially available aromatic/aliphatic copolyester is the poly(tetrabutylene adipate-co-terephthalate) sold as EASTAR BIO Copolyester from Novamont, formerly Eastman Chemical or ECOFLEX from BASF.

Additionally, carprolactone polyesters (e.g., CAPA® polyesters (produced by Perstorp, formerly from Solvay or TONE polyesters produced by Dow Chemical) and the like), can be useful in the compositions and methods described herein. These polymers are produced by a ring opening addition polymerization reaction rather than the condensation polymerization reaction used for other polyesters. The poly(hydroxycarboxylic) acids for use in the methods and compositions include lactic acid based homopolymers and copolymers, polyhydroxybutyrate (PHB), or other polyhydroxyalkanoate homopolymers and copolymers. Such polyhydroxyalkanoates include copolymers of PHB with higher chain length monomers, such as $C_6$-$C_{12}$, and higher.

The biodegradable aromatic/aliphatic polyester can be a co-polyester. It can also itself be a blend of such polyesters or co-polyesters.

Branching can be introduced into the aromatic/aliphatic polyesters to produce "high melt strength" having desired processability properties. Branching introduces side chains attached to the molecular chain backbones. The branches can vary in length and number. Branching can be accomplished by various methods known in the art. For example, branching can be introduced by the use of isocyanate compound, as described in U.S. Pat. No. 6,114,042, incorporated by reference, assigned to BASF.

Melt strength is a measure of the elongational viscosity of polymer melt. It represents the maximum tension that can be applied to the melt without rupture or tearing. Usually a capillary viscometer is used to extrude a polymer stand and the strand is pulled till rupture by a pair of rollers.

Blends of PHAs and Biodegradable Aromatic/Aliphatic Polyesters

PHAs and biodegradable aromatic/aliphatic polyesters can be combined to make blends of the polymers. In one embodiment, the blend is homogeneous.

The amount of PHA in the overall blend is 5 to 95% by weight of the total polymer blend The selection and amount of each polymer will effect the softness, stiffness, texture, toughness, and other properties of the final product as will be understood by those of ordinary skill in the art. Typically, the PHA component is present in the blend in an amount of from 5% to 95%, preferably from about 10% to about 50%, by total weight of the total polymer components of the composition.

In certain embodiments, the amount of PHA in the overall blend can be about 1% by weight, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 99% by weight. The selection and amount of each polymer will effect the softness, stiffness, texture, toughness, and other properties of the final product as will be understood by those of ordinary skill in the art. Typically, the PHA component is present in the blend in an amount of from about 10% to 95%, preferably from about 15% to about 85%, more preferably from about 20% to about 80%, by total weight of the total polymer components.

Each polymer component can contain a single polymer species or a blend of two or more species. For instance, and PHA component can in turn be a blend of PHA species as described above. Likewise, the biodegradable aromatic/aliphatic polyester component can be a mixture or blend of more than one biodegradable aromatic/aliphatic polyester.

In any of the compositions, pellets or methods disclosed herein, the biodegradable aromatic/aliphatic polyester can include aluminum hydroxy diphosphate and a carboxylate salt.

It has been found that PHA polyesters with higher levels of crystallinity are particularly useful in this invention, for example, the homopolymer PHB, the copolymer PHBV with 3HV levels of from 3% to 25%, copolymers PHB3HP with 3HP levels of 3 to 10%, PHBH with 3HH levels from 3 to 20%. The PHB homopolymer or copolymers of 3HB with low levels of copolymers such as 3HP, 3HH, 4HB, 4HV of between 3 and 10% are particularly useful. Where the PHA copolymer is isodimorphic, as is the case with the 3HV comonomer then a 3HV content of between 3 and 25% is preferred.

Methods for making and using thermoplastic compositions are well known to those of skill in the art, and skilled practitioners will appreciate that the biodegradable blends of the present invention can be used in a wide range of applications and further, as is known to skilled practitioners, can contain one or more additive, e.g., a plasticizer, nucleating agent, filler, antioxidant, ultraviolet stabilizer, lubricant, slip/antiblock, pigment, flame retardant, reinforcing, mold release, and/or antistatic agent.

Production and Processing of Biodegradable Blend Compositions

The biodegradable blend compositions described in the present invention can be produced using any art-known method that includes adding a biodegradable aromatic/aliphatic polyesters to a thermoplastic. The biodegradable aromatic/aliphatic polyesters can be added to a thermoplastic as a dry biodegradable aromatic/aliphatic polyesters composition and/or as a biodegradable aromatic/aliphatic polyesters formulation.

Optimal amounts to be added will depend on various factors known to skilled practitioners, e.g., cost, desired physical characteristics of the thermoplastic (e.g., mechanical strength), and the type of processing to being performed (raising, e.g., considerations of line speeds, cycle times, and other processing parameters). Also to be considered is whether the thermoplastic composition includes other additives, e.g., a plasticizers, nucleating agent, filler, antioxidant, ultraviolet stabilizer, lubricant, slip/antiblock, pigments, flame retardant, reinforcing agent, mold release agent, and/or antistatic agent etc. In general, however, a biodegradable aromatic/aliphatic polyesters can be included in a thermoplastic composition such that the polymeric portion of the composition contains about 5% to about 95%, e.g., about 5% to about 90%, about 20% to about 80% biodegradable aromatic/aliphatic polyesters, based on the total weight of the composition. In certain embodiments of the present invention, the polymeric portion of the composition contains about 1% to about 10%, e.g., about 1% to about 5% biodegradable aromatic/aliphatic polyesters.

Nucleating Agent

The nucleating agent for use in the compositions and methods described herein are milled nucleating agent as described in PCT/US2009/041023. filed Apr. 17, 2009, which is incorporated by reference in its entirety. Briefly, the nucleating agent is milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent is milled in liquid carrier until at at least 10% of the cumulative solid volume, at least 20% of the cumulative solid volume, at least 30% or at least 40%-50% of the nucleating agent can exist as exists as particles with a particle size of 5 microns or less, 2 microns or less or 1 micron or less. In alternative embodiments, the nucleating agents can be milled by other methods, such as jet milling and the like. Additionally, other methods can be utilized that reduce the particle size.

The cumulative solid volume of particles is the combined volume of the particles in dry form in the absence of any other substance. The cumulative solid volume of the particles can be determined by determining the volume of the particles before dispersing them in a polymer or liquid carrier by, for example, pouring them dry into a graduated cylinder or other suitable device for measuring volume. Alternatively, cumulative solid volume is determined by light scattering.

The amount of nucleating agent in liquid carrier is from 5% to 50% by weight of the nucleating agent-liquid carrier composition, preferably from 20% to 45% by weight, more preferably 30% to 40% by weight, and most preferably 40% by weight of the combined weight of the nucleating agent and liquid carrier.

Once the nucleating agent has been wet milled in the liquid carrier, an appropriate amount of the liquid carrier plus nucleating agent is then added to the polymer to be processed. One of ordinary skill in the art of polymer compounding can therefore plan the nucleant and liquid carrier ratio to suit their specific needs, knowing by experience what amount of nucleant and liquid carrier (i.e., plasticizer, surfactant, lubricant, etc.) are appropriate to use.

In certain embodiments, the nucleating agent can be selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, where the nucleating agent is dispersed in a liquid carrier, the liquid carrier can be a plasticizer, e.g., a citric compound or an adipic compound, e.g., acetylcitrate tributyrate (Citroflex A4, Vertellus, Inc., High Point, N.C.), or DBEEA (dibutoxyethoxyethyl adipate), a surfactant, e.g., Triton X-100, TWEEN-20, TWEEN-65, Span-40 or Span 85, a lubricant, a volatile liquid, e.g., chloroform, heptane, or pentane, a organic liquid or water.

In other embodiments, the nucleating agent is aluminum hydroxy diphosphate or a compound comprising a nitrogen-containing heteroaromatic core. The nitrogen-containing heteroaromatic core can be pyridine, pyrimidine, pyrazine, pyridazine, triazine, or imidazole.

Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis(4-tert-butylphenyl)phosphate, and methylene bis-(2,4-tert-butylphenyl)phosphate; sorbitol derivatives such as bis(p-methylbenzylidene)sorbitol and bis (p-ethylbenzylidene)sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

Choice of the liquid carrier is important as the carrier becomes an integral component in the polymer formulation when the nucleating agent is added. In poly-3-hydroxybutyrate compositions, for example, plasticizers are often used to change the glass transition temperature and modulus of the composition, but surfactants may also be used. Lubricants may also be used, e.g., in injection molding applications. Plasticizers, surfactants and lubricants may all therefore be used as the liquid carrier for the milling of the nucleating agent.

The liquid carrier for wet milling the nucleant can be a plasticizer. Examples of plasticizers include but are not limited to phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to, polypropylene adipate and polypropylene sebacate), epoxidized soy bean oil, epoxidized butyl stearate, epoxidized octyl stearate, chlorinated paraffins, chlorinated fatty acid esters, fatty acid compounds, plant oils, pigments, and acrylic compounds. The plasticizers may be used either alone respectively or in combinations with each other.

In certain embodiments, the liquid carrier for wet milling the nucleating agent can be a surfactant. Surfactants are generally used to de-dust, lubricate, reduce surface tension, and/or density. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Surfactants can also include detergents such as Triton X-100, TWEEN-20, TWEEN-65, Span-40 and Span 85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

In other embodiments, the liquid carrier is a lubricant. For example, a lubricant normally used in polymer processing can also be used as the liquid carrier for wet milling the nucleant. Lubricants are normally used to reduce sticking to hot processing surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants can be warmed and melted during the wet milling.

In yet other embodiments, the liquid carrier is a volatile or organic solvent. In these embodiments, a volatile solvent will be removed by devolatilization assisted by vacuum during subsequent compounding of the polymer, leaving behind the nucleating agent. Volatile liquid carriers that can be used in the invention include, alcohols (e.g., ethanol, propanol, isopropanol, etc.).

Examples of organic solvents for use in the methods and compositions of the invention include but are not limited to: n-pentane, n-hexane, isohexane, n-heptane, n-octane, isooctane, n-decane, 2,2-dimethylbutane, petroleum ether, petroleum benzene, ligroin, gasoline, kerosine, petroleum spirit, petroleum naphtha, 2-pentene, mixed pentene, cyclohexane, methylcyclohexane, benzene, toluene, xylene, ethylbenzene, diethylbenzene, isopropylbenzene, amylbenzene, diamylbenzene, triamylbenzene, tetraamylbenzene, dodecylbenzene, didodecylbenzene, amyltoluene, coal tar naphtha, solvent naphtha, p-cymene, naphthalene, tetralin, decalin, biphenyl, dipentene, turpentine oil, pinene, p-menthane, pine oil, camphor oil, methyl chloride, methylene chloride, chloroform, carbon tetrachloride, ethyl chloride, ethylene chloride, ethylidene chloride, 1,1,1-trichloroethane, 1,1,2-trichloroethane, 1,1,1,2-tetrachloroethane, 1,1,2,2-tetrachloroethane, pentachloroethane, hexachloroethane, vinylidene chloride, 1,2-dichloropropane, butyl chloride, amyl chloride, mixed amyl chloride, dichloropentane, hexyl chloride, 2-ethylhexyl chloride, methyl bromide, ethyl bromide, ethylene bromide, tetrabromoethane, chlorobromomethane, ethylene chlorobromide, chlorobenzene, o-dichlorobenzene, 1,2,4-trichlorobenzene, bromobenzene, o-dibromobenzene, o-chlorotoluene, p-chlorotoluene, alpha-chloronaphthalene, chlorinated naphthalene, fluorodichloromethane, dichlorodifluoromethane, fluorotrichloromethane, trifluoromonobromomethane, difluorochloroethane, 1,1,2-trichloro-1,2,2-trifluoroethane, ethyl ether, dichloroethyl ether, isopropyl ether, n-butyl ether, diisoamyl ether, n-hexyl ether, methyl phenyl ether, ethyl phenyl ether, n-butyl phenyl ether, amyl phenyl ether, o, m, p-cresyl methyl ether, p-t-amylphenyl n-amyl ether, ethyl benzyl ether, 1,4-dioxane, trioxane, furan, furfural, dioxolane, 2-methylfuran, tetrahydrofuran, cineol, methylal, diethyl acetal, acetone, methylacetone, methyl ethyl ketone, methyl n-propyl ketone, methyl n-butyl ketone, methyl isobutyl ketone, methyl n-amyl ketone, methyl n-hexyl ketone, diethyl ketone, ethyl n-butyl ketone, di-n-propyl ketone, diisobutyl ketone, 2,6,8-trimethylnonanone-4, acetone oil, acetonylacetone, mesityl oxide, phorone, isophorone, cyclohexanone, methylcyclohexanone, acetophenone, dypnone, camphor, methyl formate, ethyl formate, propyl formate, n-butyl formate, isobutyl formate, methyl acetate, ethyl acetate, n-propyl acetate, isopropyl acetate, n-butyl acetate, isobutyl acetate, sec-butyl acetate, n-amyl acetate, isoamyl acetate, methylisoamyl acetate, methoxybutyl acetate, sec-hexyl acetate, 2-ethylbutyl acetate, methylisobutylcarbinol acetate, 2-ethylhexyl acetate, cyclohexyl acetate, methylcyclohexyl acetate, benzyl acetate, methyl propionate, ethyl propionate, n-butyl propionate, isoamyl propionate, methyl butyrate, ethyl butyrate, n-butyl butyrate, isoamyl butyrate, ethyl oxyisobutyrate, butyl stearate, amyl stearate, methyl acetoacetate, ethyl acetoacetate, isoamyl isovalerate, methyl lactate, ethyl lactate, butyl lactate, amyl lactate, methyl benzoate, ethyl benzoate, propyl benzoate, butyl benzoate, isoamyl benzoate, benzyl benzoate, ethyl cinnamate, methyl salicylate, octyl adipate, diethyl oxalate, dibutyl oxalate, diamyl oxalate, diethyl malonate, dibutyl tartrate, tributyl citrate, dioctyl sebacate, dimethyl phthalate, diethyl phthalate, dibutyl phthalate, di-2-ethylhexyl phthalate, dioctyl phthalate, nitromethane, nitroethane, nitropropane, nitrobenzene, nitroanisole, monomethylamine, dimethylamine, trimethylamine, monoethylamine, diethylamine, triethylamine, aniline, toluidine, acetoamide, acetonitrile, benzonitrile, pyridine, picoline, lutidine, quinoline, morpholine, carbon disulfide, dimethyl sulfoxide, propanesulfone, triethyl phosphate, polyethylene glycol, polypropylene glycol, polytetramethylene glycol, and polyepichlorohydrin. These organic solvents may be used either alone respectively or in combinations with each other.

An advantage of using a volatile liquid is that the liquid will be removed during processing in the extruder, and can be removed. This can be advantageous for applications where little of the liquid additive is desired in the finished polymer product.

In still another embodiments, the liquid carrier for wet milling the nucleating agent is water. An advantage of using water is that it, like the volatile solvents, will also be removed during processing. Additionally, no residue behind is left behind, and minimal or no effect on the chemistry of the polymer itself is found.

In yet other embodiments, the liquid carrier for wet milling the nucleating agent can be a mixture of any of the above. For instance, the liquid carrier can be a mixture of one or more plasticizers, one or more surfactants, one or more volatile liquid carriers, or water. The liquid carrier can also be a mixture of one or more plasticizers, surfactants, volatile liquid carriers, or water.

One of ordinary skill in the polymer processing arts can therefore compose the overall liquid carrier with consideration for the later processing of the polymer. For instance, if the polymer application calls for only a small amount of plasticizer or surfactant, then one can compose a liquid carrier with a small amount of plasticizer or surfactant, with the balance of the carrier being a volatile liquid that will be removed during processing.

Optionally, an additive can be included in the thermoplastic composition. The additive can be any compound known to those of skill in the art to be useful in the production of thermoplastics. Exemplary additives include, e.g., plasticizers (e.g., to increase flexibility of a thermoplastic composition), antioxidants (e.g., to protect the thermoplastic composition from degradation by ozone or oxygen), ultraviolet stabilizers (e.g., to protect against weathering), lubricants (e.g., to reduce friction), pigments (e.g., to add color to the thermoplastic composition), flame retardants, fillers, reinforcing, mold release, and antistatic agents. It is well within the skilled practitioner's abilities to determine whether an additive should be included in a thermoplastic composition and, if so, what additive and the amount that should be added to the composition.

In poly-3-hydroxybutyrate compositions, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall blend.

The blend can include one or more plasticizers. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to reaction products of diols selected from butane diol, ethylene glycol, propane 1,2 diol, propane 1,3 diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other.

The blend can include one or more surfactants. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Non-ionic surfactants with HLB values ranging from about 2 to about 16 can be used examples being TWEEN-20, TWEEN-65, Span-40 and Span 85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

One or more lubricants can also be added to the blend. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants can be warmed and melted before or during processing of the blend.

In particular embodiments, the nucleating agent can include aluminum hydroxy diphosphate or a compound comprising a nitrogen-containing heteroaromatic core. The nitrogen-containing heteroaromatic core can be pyridine, pyrimidine, pyrazine, pyridazine, triazine, or imidazole. The nucleant can have a chemical formula selected from the group consisting of

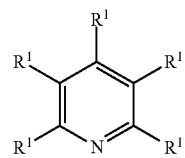

Formula 1

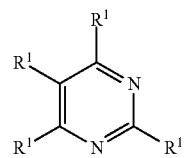

Formula 2

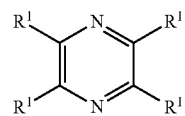

Formula 3

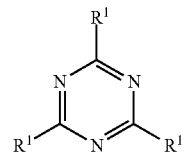

Formula 4

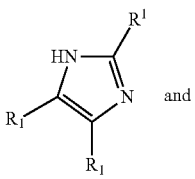

Formula 5 and

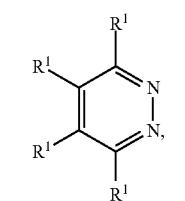

Formula 6 and combinations thereof, wherein each R1 is independently H, $NR^2R^2$, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

For the fabrication of useful articles, a blend composition described herein is created at a temperature above the crystalline melting point of the thermoplastic but below the decomposition point of any of the ingredients of the composition. Alternatively, a pre-made blend composition of the present invention is simply heated to such temperature. While in heat plastified condition, the composition is processed into a desired shape, and subsequently cooled to set the shape and induce crystallization. Such shapes can include, but are not limited to, a fiber, filament, film, sheet, rod, tube, bottle, or other shape. Such processing can be performed using any art-known technique, such as, but not limited to, extrusion, injection molding, compression molding, blowing or blow molding (e.g., blown film, blowing of foam), calendering, rotational molding, casting (e.g., cast sheet, cast film), or thermoforming.

The thermoplastic compositions of the present invention can be used to create, without limitation, a wide variety of useful products, e.g., automotive, consumer disposable, consumer durable, construction, electrical, medical, and packaging products. For instance, the blends can be used to make, without limitation, films (e.g., packaging films, agricultural film, mulch film, erosion control, hay bale wrap, slit film, food wrap, pallet wrap, protective automobile and appliance wrap, etc.), golf tees, caps and closures, agricultural supports and stakes, paper and board coatings (e.g., for cups, plates, boxes, etc.), thermoformed products (e.g., trays, containers, yoghurt pots, cup lids, plant pots, noodle bowls, moldings, etc.), housings (e.g., for electronics items, e.g., cell phones, PDA cases, music player cases, computer cases and the like), bags (e.g., trash bags, grocery bags, food bags, compost bags, etc.), hygiene articles (e.g., diapers, feminine hygiene products, incontinence products, disposable wipes, padding, etc.), coatings for pelleted products (e.g., pelleted fertilizer, herbicides, pesticides, seeds, etc The invention will be further described in the following examples, which do not limit the scope of the invention defined by the claims.

EXAMPLES

Example 1

Blowing Film with Blends of PHA and Polybutylene Adipate-Terephthalate

Poly-3-hydroxybutyrate-co-7%-3-hydroxyvalerate (PHBV) and poly-4-hydroxybutyrate-co-7%-4-hydroxybutyrate (PHB 7% 4HB) compositions when blended with small portions of Ecoflex (polybutylene adipate-terephthalate) (10-30%) showed improvements in melt elasticity and hence greater ability to blow a bubble than with 100% PHA. During the melt blowing stage of the operation whilst the blend was still at high temperatures, i.e., >80° C., the film was completely transparent indicating a homogenous composition. However, on cooling, the film becomes opaque indicating phase separation. Tensile strength was largely unaffected however elongation at break and qualitative tear strength were both improved.

Polybutylene adipate-terephthalate with small levels of highly crystalline PHAs (PHBV, PHB 7% 4HB) exhibited similar transitions from a clear film at high temperatures to an opaque film when cold. PHA addition improved the apparent rate of crystallization of the film as seen by reduced blocking. Compositions comprising 20% PHA and 80% polybutylene adipate-terephthalate showed no signs of blocking within 5 minutes of film blowing, without the aid of process lubricants. The same film thickness grade produced with polybutylene adipate-terephthalate showed complete blocking, thicker films could be made which could be separated after the film had been aged for several days to promote crystallization. Typically larger amounts of antiblock additives (>0.8%) were required to avoid film blocking with pure polybutylene adipate-terephthalate films.

Addition of PHA to polybutylene adipate-terephthalate compositions improved the rate of biodegradation under compositing conditions.

Example 2

Demonstration of Impact Modification of Polyhydroxybutyrate

PHB and polybutylene adipate-terephthalate pellets were melt blended together with a nucleating agent (see formulations 1-4 in Table 1, below) using a Brabender compounding unit at 165-170° C. and extruder to form a strand which was subsequently cut to form pellets. The pellets were injection molded using a melt temperature of 160° C. and a mold temperature of 50° C. to form ASTM impact bars. After allowing the bars rest at ambient temperature for 48 hours they were notched according to the procedure outlined in ASTM D256 and tested for impact strength.

TABLE 1

Formulations for testing impact strength of PHB blended with polybutylene adipate-terephthalate.

| | Formulation | | | |
|---|---|---|---|---|
| | 1 | 2 | 3 | 4 |
| Polybutylene adipate-terephthalate | 0 | 10 | 25 | 40 |
| PHB | 100 | 90 | 75 | 60 |
| 25% Cyanuric Acid compounded in PHB Carrier | 4 | 4 | 4 | 4 |
| notched impact lbf/in | 0.408 | 0.378 | 0.474 | 1.43 |

The data shows that polybutylene adipate-terephthalate can significantly improve the impact performance properties of PHB. Inclusion of 40% by weight or more of polybutylene adipate-terephthalate was found to enhance the impact strength of the overall blend.

Example 3

Demonstration of Impact Modification of Poly-3-hydroxybutyrate-co-7%-3-hydroxyvalerate Poly-3-hydroxybutyrate-co-7%-3-hydroxyvalerate and polybutylene adipate-terephthalate pellets were melt blended together with a nucleating agent (see formulations 5-8 in Table 2, below) using a Brabender compounding unit at 165-170° C. and extruder to form a strand which was subsequently cut to form pellets. The pellets were injection molded using a melt temperature of 160° C. and a mold temperature of 50° C. to form ASTM impact bars. After conditioning the bars for 48 hours they were notched according to the procedure outlined in ASTM D256 and tested for impact strength.

TABLE 2

Formulations for testing impact modification of PHBV blended with polybutylene adipate-terephthalate.

| | Formulation | | | |
|---|---|---|---|---|
| | 5 | 6 | 7 | 8 |
| Polybutylene adipate-terephthalate | 0 | 10 | 25 | 40 |
| Poly-3-hydroxybutyrate-co-7%-3-hydroxyvalerate. | 100 | 90 | 75 | 60 |
| 25% Cyanuric Acid compounded in PHB Carrier | 4 | 4 | 4 | 4 |
| notched impact lbf/in | 0.532 | 0.461 | 0.664 | 2.41 |

The data shows that although poly-3-hydroxybutyrate-co-7%-3-hydroxyvalerate. had a higher impact strength compared with PHB, the incorporation polybutylene adipate-terephthalate can further improve the impact performance properties of poly-3-hydroxybutyrate-co-7%-3-hydroxyvalerate.compositions.

Example 4

Demonstration of Impact Modification of poly-3-hydroxybutyrate-co-7%-4-hydroxybutyrate Poly-3-hydroxybutyrate-co-7%-4-hydroxybutyrate and polybutylene adipate-terephthalate pellets were melt blended together with a nucleating agent (see formulations 9-12 in Table 3, below) using a Brabender compounding unit at 165-170° C. and extruder to form a strand which was subsequently cut to form pellets. The pellets were injection molded using a melt temperature of 160° C. and a mold temperature of 50° C. to form ASTM impact bars. After conditioning the bars for 48 hours they were notched according to the procedure outlined in ASTM D256 and tested for impact strength.

TABLE 3

Formulations for testing impact modification of Poly-3-hydroxybutyrate-co-7%-4-hydroxyvalerate blended with polybutylene adipate-terephthalate.

|  | Formulation | | | |
| --- | --- | --- | --- | --- |
|  | 9 | 10 | 11 | 12 |
| Polybutylene adipate-terephthalate | 0 | 10 | 25 | 40 |
| Poly-3-hydroxybutyrate-co-7%-4-hydroxybutyrate | 100 | 90 | 75 | 60 |
| 25% Cyanuric Acid compounded in PHB Carrier | 4 | 4 | 4 | 4 |
| notched impact lbf/in | 0.718 | 0.884 | 1.185 | 2.71 |

The data shows that although poly-3-hydroxybutyrate-co-7%-4-hydroxybutyrate had a higher impact strength compared with either PHB or PHBV7 resins, the incorporation polybutylene adipate-terephthalate can further improve the impact performance properties of poly-3-hydroxybutyrate-co-7%-4-hydroxybutyrate compositions.

Example 5

Impact Modification of Poly-3-hydroxybutyrate-co-5% 3 hydroxyhexanoate

Poly-3-hydroxybutyrate-co-5% 3 hydroxyhexanoate and polybutylene adipate-terephthalate pellets are melt blended together with a nucleating agent (see formulations 13-15 in Table 4, below) using a Brabender compounding unit at 165-170° C. and extruder to form uniform strands of diameter 2 mm. The strands are placed in a refrigeration unit for 24 hours to equilibrate and the ductility assessed by wrapping the strand around mandrels of differing diameters until the strand either cracks or breaks.

TABLE 4

Formulations for testing impact modification of poly-3-hydroxybutyrate-co-5% 3 hydroxyhexanoate blended with polybutylene adipate-terephthalate.

|  | Formulation | | |
| --- | --- | --- | --- |
|  | 13 | 14 | 15 |
| Polybutylene adipate-terephthalate | 0 | 20 | 40 |
| Poly-3-hydroxybutyrate-co-5% 3 hydroxyhexanoate | 100 | 80 | 60 |
| 25% Cyanuric Acid compounded in PHB Carrier | 4 | 4 | 4 |

Example 6

Demonstration of Film Grade Processing Observations

Formulations 16 through 22 (Table 5, below) show the film processing characteristics of polybutylene adipate-terephthalate and two PHA blends (PHA Blend 1: poly-3-hydroxybutyrate-co-7%-3-hydroxyvalerate; PHA Blend 2: poly-3-hydroxybutyrate-co-33%-4-hydroxybutyrate) produced by melt blending of the various components. Formulation 21 contains no polybutylene adipate-terephthalate and reflects the typical properties of a PHA resin blend formulation while Formulation 22 reflects the processing characteristics of a polybutylene adipate-terephthalate film. Films were blown with a 25 mm circular die with a draw ratio of about 2.5:1, the bubble length was approximately 1 m high before being nipped together to form a compressed tube. The stability of the bubble, ability to separate the nipped films and ability to reduce film thickness, were all evaluated.

TABLE 5

Formulations for testing film grades made with blends of PHA and polybutylene adipate-terephthalate.

|  | Formulation | | | | | | |
| --- | --- | --- | --- | --- | --- | --- | --- |
|  | 16 | 17 | 18 | 19 | 20 | 21 | 22 |
| Polybutylene adipate-terephthalate | 80 | 70 | 40 | 30 | 20 | 0 | 100 |
| PHBV-7 | 14.4 | 21.7 | 43.3 | 50.5 | 57.8 | 72.2 | 0.0 |
| Cyanuric acid | 0.2 | 0.3 | 0.5 | 0.6 | 0.7 | 0.9 | 0.0 |
| Citroflex A4 | 1.9 | 2.9 | 5.8 | 6.7 | 7.7 | 9.6 | 0.0 |
| PHB33 | 3.5 | 5.2 | 10.4 | 12.2 | 13.9 | 17.4 | 0.0 |
| bubble stability | good | good | good | good | good | poor | good |
| film release on nipping | good | very good | excellent | excellent | excellent | excellent | poor |
| draw down | excellent | excellent | excellent | excellent | excellent | poor | excellent |

Formulation 21 which was based only on PHA blends (molecular weight, Mw, of around 450,000 as measured by GPC, polystyrene equivalents) showed noticeable wandering in the bubble stability and could only be drawn down to 1000-1200 microns. The incorporation of polybutylene adipate-terephthalate at levels from 20% (formulation 20) to 80% (formulation 16) allowed the film thickness to be reduced down to around 100-120 microns with good stability.

Polybutylene adipate-terephthalate films when immediately blown are very soft and show a strong tendency to block, even with the addition of traditional slip/antiblock additives, this makes it very difficult to separate the films for several days reducing the commercial value of such formulations. The incorporation of PHA resins into polybutylene adipate-terephthalate immediately reduced the blocking problems so that the films could immediately be separated, hence allowing traditional slitting and film separation operations to be carrier out inline to the film blowing process.

These experiments demonstrate unexpected synergistic performance for polybutylene adipate-terephthalate/PHA blends, enhancing the properties of the individual compositions.

Example 7

Film Mechanical Properties

Seven formulations were made as shown in the table below. PHA Blend 1 was poly-(3-hydroxybutyrate-co-8%-poly-3-hydroxyvalerate). PHA Blend 2 was poly-3-hydroxybutyrate-co-33%-4-hydroxybutyrate). Film samples of 100-120 microns in thickness were produced using the same processing conditions as described in Example 6 and were aged under ambient conditions for 2 years before being tested for tensile properties in the transverse direction.

TABLE 6

Formulations for testing mechanical properties of films from Example 6.

| | Formulation | | | | | | |
|---|---|---|---|---|---|---|---|
| | 22 | 23 | 16 | 17 | 18 | 20 | 24 |
| PHA Blend 1 | 0 | 7.1 | 14.4 | 21.7 | 43.3 | 57.8 | 71.0 |
| Cyanuric acid | 0 | 0.1 | 0.2 | 0.3 | 0.5 | 0.7 | 1.0 |
| Citroflex A4 | 0 | 1.0 | 1.9 | 2.9 | 5.8 | 7.7 | 10.0 |
| PHA Blend 2 | 0 | 1.8 | 3.5 | 5.2 | 10.4 | 13.9 | 18.0 |
| Polybutylene adipate-terephthalate | 100 | 90 | 80 | 70 | 40 | 20 | 100 |
| Young's modulus MPa | 137.5 | 456.3 | 639.8 | 524.5 | 445.5 | 223.6 | 860.4 |
| Stress @ yield MPa | 10.5 | 14.2 | 17.8 | 16.7 | 16.0 | 14.0 | 10.2 |
| Elongation @ yield % | 14.5 | 12.7 | 12.7 | 12.9 | 9.7 | 10.4 | 5.4 |
| Stress @ break MPa | 26.5 | 15.7 | 19.8 | 23.5 | 31.5 | 30.2 | 38.5 |
| Elongation @ break % | 505.7 | 259.4 | 314.8 | 370.0 | 461.4 | 480.5 | 95.3 |

All the results showed extremely good retention of properties on aging compared with the original tensile properties. PHA increased the modulus ad tensile strength properties of polybutylene adipate-terephthalate. Whilst polybutylene adipate-terephthalate improved the extensional properties of the PHA blends. This allowed the development of versatile formulations suitable for a range of commercial applications.

The methods, compositions and pellets described herein are useful for a number of different plastics processing methods and finished articles where the resultant product is desired to be biodegradable. Such plastics processing methods can include injection molding, cast and blown film, cast sheet, thermoforming, blow molding, fiber extrusion and fiber spinning, rotomolding foaming extruding the compositions or pellets. The thermoplastic compositions of the present invention can be used to create, without limitation, a wide variety of useful products, e.g., automotive parts, consumer disposable items, consumer durable items, construction, electrical, medical, and packaging products. For instance, the compositions and pellets can be used to make, without limitation, films (e.g., packaging films, agricultural film, mulch film, erosion control, hay bale wrap, slit film, food wrap, pallet wrap, protective automobile and appliance wrap, etc.), golf tees, caps and closures, agricultural supports, ties and stakes, paper and board coatings (e.g., for cups, plates, boxes, etc.), thermoformed products (e.g., trays, containers, yoghurt pots, cup lids, plant pots, noodle bowls, moldings, etc.), housings (e.g., for electronics items, e.g., cell phones, PDA cases, music player cases, computer cases and the like), bags (e.g., trash bags, grocery bags, food bags, compost bags, etc.), hygiene articles (e.g., diapers, feminine hygiene products, incontinence products, disposable wipes, padding, etc.), coatings for pelleted products (e.g., pelleted fertilizer, herbicides, pesticides, seeds, etc.), foamed products, like clamshells, cups, plates, insulation, packaging pellets, sheet foam.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:
1. A composition comprising:
   a blend comprising biologically-produced poly-3-hydroxybutyrate, poly(3-hydroxybutyrate)-co-poly(4-hydroxybutyrate) with a 10-13% 4-hydroxybutyrate content, and poly(3-hydroxybutyrate)-co-poly(4-hydroxybutyrate) with a 26-35% 4-hydroxybutyrate content;
   a biodegradable aromatic/aliphatic polyester; and
   a nucleating agent, wherein the composition is a blend, wherein the biodegradable aromatic/aliphatic polyester is a co polymer of:
      i) at least one aliphatic dicarboxylic acid; and/or
      ii) at least one aromatic dicarboxylic acid; and
      iii) a dihydroxy compound.

2. The composition of claim 1, wherein the aliphatic dicarboxylic acid is selected from succinic acid, glutaric acid, dimethyl glutaric acid, adipic acid, sebacic acid or azelaic acid; wherein the aromatic dicarboxylic acid is selected from terephthalic acid or naphthalene dicarboxylic acid; and wherein the dihydroxy compound is selected from $C_2$-$C_6$ alkanediols and $C_5$-$C_{10}$ cycloalkanediols ethylene glycol, propylene glycol, 1,4-butanediol, 1,6 hexanediol, or 1,4 cyclohexanedimethanol.

3. The composition of claim 1, wherein the biodegradable aromatic/aliphatic polyester is selected from:
   polybutylene adipate terephthalate,
   polyethylene adipate terephthalate,
   polybutylene succinate terephthalate, and
   polyethylene succinate terephthalate.

4. The composition of claim 1, wherein the composition comprises at least two aromatic/aliphatic polyesters.

5. The composition of claim 1, wherein from 5 to 95 percent by weight of the total polymer components of the composition is the biodegradable aromatic/aliphatic polyester or wherein from 10 to 50 percent by weight of the total polymer components of the composition is the biodegradable aromatic/aliphatic polyester.

6. The composition of claim 1, wherein from 5 to 95 percent by weight of the composition is the blend of two or more biologically-produced polyhydroxyalkanoate copolymers.

7. The composition of claim 1, wherein the biodegradable aromatic/aliphatic polyester is branched.

8. The composition of claim 1, wherein from 50 to 90 percent by weight of the total polymer components of the composition is the blend of two or more linear biologically-produced polyhydroxyalkanoate copolymers.

9. The composition of claim 1, wherein the nucleating agent is selected from cyanuric acid, carbon black, mica talc, silica, boron nitride, clay, calcium carbonate, synthesized silicic acid or a salt thereof, a metal salt of organophosphates and a kaolin aluminum hydroxy diphosphate or the nucleating agent has a chemical formula selected from the group consisting of

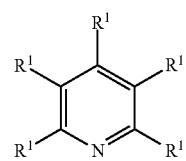

Formula 1

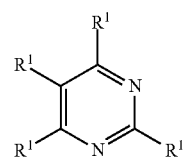

Formula 2

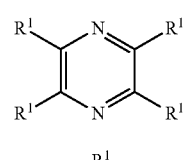

Formula 3

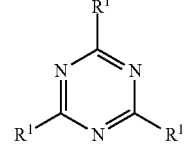

Formula 4

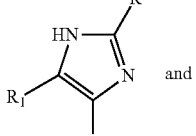

Formula 5 and

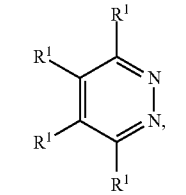

Formula 6 and combinations thereof, wherein each R1 is independently H, $NR^2R^2$, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

10. The composition of claim 1, wherein the blend of at least two or more linear biologically-produced polyhydroxyalkanoate copolymers comprises about 36% poly(3-hydroxybutyrate), blended with about 24% (poly(3-hydroxybutyrate-co-11%-poly(4-hydroxybutyrate), and about 40% (poly(3-hydroxybutyrate-co-28%-poly(4-hydroxybutyrate).

11. The composition of claim 1, wherein the poly-3-hydroxybutyrate-co-4-hydroxybutyrate comprises a 10% 4-hydroxybutyrate content, an 11% 4-hydroxybutyrate content, a 12% 4-hydroxybutyrate content, or a 13% 4-hydroxybutyrate content.

12. A method of forming a polymer resin pellet comprising:
melting the composition of claim 1 under suitable conditions and forming a polymer resin pellet.

13. An article comprising the composition of claim 1, wherein the article is in the form of a film.

14. A blown film comprising:
a blend comprising biologically-produced poly-3-hydroxybutyrate, poly(3-hydroxybutyrate)-co-poly(4-hydroxybutyrate) with a 10-13% 4-hydroxybutyrate content, and poly(3-hydroxybutyrate)-co-poly(4-hydroxybutyrate) with a 26-35% 4-hydroxybutyrate content;
a biodegradable aromatic/aliphatic polyester; and
a nucleating agent, wherein the composition is a blend, wherein the biodegradable aromatic/aliphatic polyester is a co polymer of:
i) at least one aliphatic dicarboxylic acid; and/or
ii) at least one aromatic dicarboxylic acid; and
iii) a dihydroxy compound.

15. The blown film of claim 14, wherein the aliphatic dicarboxylic acid is selected from succinic acid, glutaric acid, dimethyl glutaric acid, adipic acid, sebacic acid or azelaic acid; wherein the aromatic dicarboxylic acid is selected from terephthalic acid or naphthalene dicarboxylic acid; and wherein the dihydroxy compound is selected from $C_2$-$C_6$ alkanediols and $C_5$-$C_{10}$ cycloalkanediols ethylene glycol, propylene glycol, 1,4-butanediol, 1,6 hexanediol, or 1,4 cyclohexanedimethanol.

16. The blown film of claim 14, wherein the biodegradable aromatic/aliphatic polyester is selected from:
polybutylene adipate terephthalate,
polyethylene adipate terephthalate,
polybutylene succinate terephthalate, and
polyethylene succinate terephthalate.

* * * * *